United States Patent
Buford et al.

(10) Patent No.: US 10,469,802 B2
(45) Date of Patent: Nov. 5, 2019

(54) DISTURBANCE DETECTION IN VIDEO COMMUNICATIONS

(71) Applicant: Avaya Inc., Basking Ridge, NJ (US)

(72) Inventors: John F. Buford, Princeton, NJ (US); Mehmet C. Balasaygun, Freehold, NJ (US); Keith Ponting, Malvern (GB); Wendy Holmes, Malvern (GB)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/823,088

(22) Filed: Aug. 11, 2015

(65) Prior Publication Data

US 2017/0048492 A1 Feb. 16, 2017

(51) Int. Cl.
 *H04N 7/14* (2006.01)
 *G11B 27/036* (2006.01)
 *H04N 7/15* (2006.01)
 *G06K 9/00* (2006.01)

(52) U.S. Cl.
 CPC ......... *H04N 7/155* (2013.01); *G06K 9/00718* (2013.01); *G11B 27/036* (2013.01); *H04N 7/147* (2013.01); *H04N 7/152* (2013.01); *G06K 2009/00738* (2013.01)

(58) Field of Classification Search
 CPC .. G11B 27/03; G11B 27/036; G06K 9/00718; G06K 2009/00738; H04N 7/147; H04N 7/152; H04N 7/155

USPC .......................................... 348/14.01–14.16
See application file for complete search history.

(56) References Cited

U.S. PATENT DOCUMENTS

| | | | |
|---|---|---|---|
| 2004/0056907 A1* | 3/2004 | Sharma | G10L 15/24 715/863 |
| 2010/0198579 A1* | 8/2010 | Cunnington | H04L 12/1822 704/3 |
| 2010/0280828 A1* | 11/2010 | Fein | G10L 15/1822 704/246 |
| 2017/0004356 A1* | 1/2017 | Gil | G06K 9/00315 |

\* cited by examiner

*Primary Examiner* — Hemant S Patel

(57) ABSTRACT

Embodiments disclosed herein provide systems, methods, and computer readable media for detecting disturbances in a media stream from a participant on a communication. In a particular embodiment, a method provides identifying disturbance criteria defining a plurality of audible disturbances, a plurality of visual disturbances, and a plurality of communication disturbances. The method further provides identifying one or more audible disturbances from an audio component of the media stream based on predefined disturbance criteria and identifying one or more visual disturbances from a video component of the media stream based on the disturbance criteria. Additionally, the method provides correlating the audible disturbances with the visual disturbances to determine one or more combined disturbances for the participant based on the disturbance criteria, wherein each of the combined disturbances comprises at least one of the audible disturbances and at least one of the visual disturbances.

18 Claims, 7 Drawing Sheets

US 10,469,802 B2

DISTURBANCE DETECTION IN VIDEO COMMUNICATIONS

TECHNICAL FIELD

Aspects of the disclosure are related to video communications between participants and, in particular, to detecting disturbances in those video communications.

TECHNICAL BACKGROUND

Video is now a popular form of communicating between two or more parties. Both audio and video is captured of participants on a video communication and transferred to the other participants. Like audio communications, video communications can be established between two parties or between more than two parties, as may be the case during a video conference. The video component of such communications improves upon audio communications in that a participant on the communication is able to see other participants along with other visual aids that those participants may be presenting. At the very least, the facial expressions that can be seen in the video communication can add more depth to the conversation itself that might otherwise have been missed over an audio only connection.

Conversely, video communications are more prone to disturbances since participants not only hear other participants but they also see them. Thus, each participant that is captured on video must be aware of their appearance in that video. For example, a participant that coughs during an audio-only communication would simply have that cough heard by other participants. However, when video accompanies that audio, the participant may need to cover their mouth or turn away from the video camera in conjunction with the cough. Such actions would not be needed if the participant was not captured on video during the cough. Likewise, other conversational norms may need to be followed during a video communication (e.g. eye contact, smiling, etc.) that would not otherwise need to be followed to maintain a disturbance-free audio communication.

OVERVIEW

Embodiments disclosed herein provide systems, methods, and computer-readable media for detecting disturbances in a media stream from a participant on a communication. In a particular embodiment, a method provides disturbance-detection criteria defining a plurality of audible disturbances, a plurality of visual disturbances, and a plurality of communication disturbances. The method further provides identifying one or more audible disturbances from an audio component of the media stream based on predefined disturbance-detection criteria and identifying one or more visual disturbances from a video component of the media stream based on the disturbance criteria. Additionally, the method provides correlating the audible disturbances with the visual disturbances to determine one or more combined disturbances for the participant based on the disturbance criteria, wherein each of the combined disturbances comprises at least one of the audible disturbances and at least one of the visual disturbances.

In some embodiments, the method provides receiving biometric information about the participant contemporaneously with the media stream and correlating the biometric information along with the audible disturbances and the visual disturbances to determine the combined disturbances.

In some embodiments, the method provides correlating the audible disturbances with the visual disturbances to determine whether any of the audible and visual disturbances were falsely identified.

In some embodiments, the method provides determining a disturbance score for the participant based on the audible, visual, and combined disturbances.

In some embodiments, factors used when determining the disturbance score comprise one or more of a total amount of disturbances, an amount of disturbances by type of disturbance, and frequency of disturbances.

In some embodiments, the method provides for at least one disturbance of the audible disturbances, removing the at least one disturbance from the media stream.

In some embodiments, the method provides for at least one disturbance of the audible, visual, and combined disturbances, replacing the at least one disturbance in the media stream with a prerecorded media stream element.

In some embodiments, the method provides for at least one disturbance of the audible, visual, and combined disturbances, inserting a prerecorded media stream element into the media stream after the at least one disturbance.

In some embodiments, the method includes providing the participant with feedback concerning the audible, visual, and combined disturbances.

In some embodiments, the feedback includes at least one recommendation for mitigating at least one of the audible, visual, and combined disturbances.

In another embodiment, a system is provided comprising an interface and a processing system. The interface is configured to receive an audio component of the media stream and a video component of the media stream. The processing system is configured to identify disturbance criteria defining a plurality of audible disturbances, a plurality of visual disturbances, and a plurality of communication disturbances. The processing system is further configured to identify one or more audible disturbances from the audio component of the media stream based on predefined disturbance criteria and identify one or more visual disturbances from the video component of the media stream based on the disturbance criteria. Also, the processing system is configured to correlate the audible disturbances with the visual disturbances to determine one or more combined disturbances for the participant based on the disturbance criteria, wherein each of the combined disturbances comprises at least one of the audible disturbances and at least one of the visual disturbances.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

During a video communication, disturbances caused by participants on the communication are captured just as though the participants are speaking in person. These disturbances may include coughs, sneezes, lack of eye contact, sniffles, subconscious movements, or any other action that may detract from the conversation. While these disturbances may be forgiven in some communications, such as a video call between friends, in other situations the disturbances may have a greater effect. For example, if a video communication is part of a contact center communication between a customer and an agent, then the customer may be adversely effected by the amount and type of disturbances during the video communication (e.g. make a less than favorable decision due to the disturbances by the agent). In a similar example, when a participant is a presenter on a video conference, the disturbances that the presenter creates may adversely effect the other participants' assimilation of information.

Accordingly, the disturbance system described herein detects the disturbances in a media stream captured of at least one participant on a video communication. Based on the detected disturbances, actions can be taken to mitigate the disturbances either during the communication being analyzed for disturbances or at some future time. For example, the participant may be notified of the disturbances or trained to avoid causing the disturbances in the future. In other examples, the disturbance system may correct the media stream to mitigate the disturbance in real time during the communication. Regardless of what features are implemented, the disturbance system is meant to reduce the amount of disturbances in video communications in order to improve the video communication experience.

Figure 1:
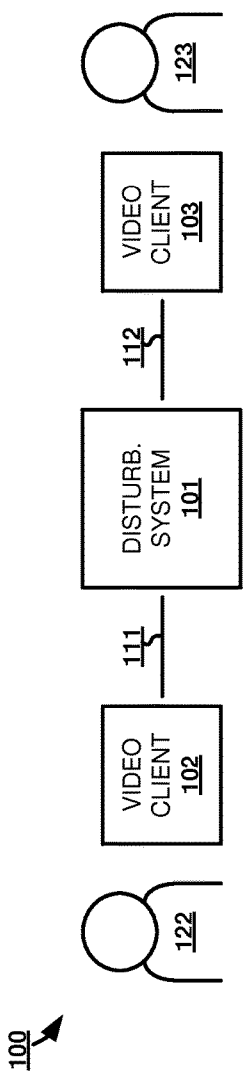
FIG. 1 illustrates a video communication environment for detecting disturbances in video communications.

FIG. 1 illustrates video communication environment 100 in an example of detecting disturbances in video communications. Video communication environment 100 includes disturbance system 101, video client system 102, and video client system 103. Video client systems 102 and 103 are operated by participants 122 and 123, respectively. Video client system 102 and disturbance system 101 communicate over communication link 111. Video client system 103 and disturbance system 101 communicate over communication link 112.

In this example, disturbance system 101 is shown on the communication path between video client systems 102 and 103. However, disturbance system 101 may be located on a different communication path. Additionally, in some examples, the functionality of disturbance system 101 may be incorporated into one of video client systems 102 and 103. Alternatively, disturbance system 101 may be incorporated into a video service system (e.g. video conference system) that facilitates video communications between video client systems 102 and 103.

Figure 2:
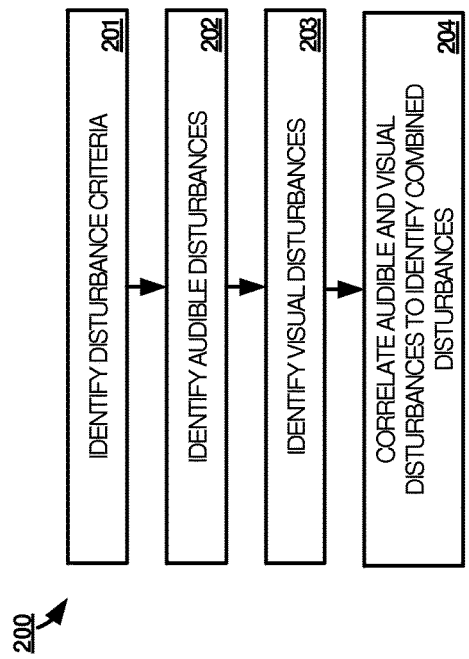
FIG. 2 illustrates a method of operating the video communication environment to detect disturbances in video communications.

FIG. 2 illustrates a method 200 for operating video communication environment 100 to detect disturbances in video communications. Method 200 provides disturbance system 101 identifying disturbance criteria defining audible disturbances, visual disturbances, and communication disturbances (step 201). The various disturbances may be defined based on definition information provided by an administrator of disturbance system 101, may be preprogrammed into disturbance system 101, may be learned from previous video communications, or from some other source. The disturbance definitions may apply to specific participants or may apply to multiple participants. In one example, a disturbance may be generally defined, such as a participant touching their face with their hand. Video image processing will then be relied upon to determine whether the participant performs that face touching action. In another example, the disturbance may be defined more specifically. For instance, instead of merely defining a cough as being a disturbance, a waveform may be provided that represents a cough for use in comparison. Other ways of defining a disturbance may also be used depending on the media processing capabilities of disturbance system 101.

The disturbances defined by the disturbance criteria may include physiological events, such as yawns, sneezes, coughs, hiccups, sniffles, and the like. Likewise, the disturbances may include non-speech utterances, such as throat clears, clicks, cries, grunts, laughs, noise, pauses, sighs, smacks, swallows, and the like. The disturbances may further include emotional expressions such as frowns, grimaces, or other types of unpleasant expressions. Additionally, facial contact or mannerisms, such as brushing hair, straightening glasses, touching, scratching, or rubbing of the face, and the like, may also be defined as disturbances. Other or different types of disturbances may also be defined and may vary from participant to participant.

Method 200 then provides identifying one or more audible disturbances from an audio component of a media stream from video client system 102 to video client system 103 based on predefined disturbance criteria (step 202). The media stream comprises data communications representing the audio and video captured of participant 122 for a video communication between participant 122 and participant 123 using their respective video client systems 102 and 103. The video communication may be a one-on-one communication between participants 122 and 123 or, though not shown, may include additional participants and video client systems. In some examples, a video communication system may be used to facilitate the video communication between video client system 102 and video client system 103. Additionally, the video communication may use any video communication protocol, such as WebRTC, Real-Time Protocol (RTP), or some other protocol. While the media stream referred to in this example is from video client system 102, method 200 may be performed on the media stream from video client system 103 or any other video client system on the video communication.

When identifying the audible disturbances, disturbance system 101 may need to decode the audio component of the media stream. Disturbance system 101 then analyzes the audio in the audio component to determine whether any of the audio qualifies as an audible disturbance based on the disturbance criteria. In some examples, disturbance system 101 may compare the audio waveform to waveforms in the disturbance criteria to determine whether a portion of the audio waveform substantially matches a waveform in the criteria. If so, then disturbance system 101 will identify that portion of the audio waveform as a disturbance of the type corresponding to the matched waveform in the criteria. Additionally, speech recognition techniques that commonly model laughter, coughs, sneezes, and the like, may also be used to identify audible disturbances.

In addition to audible disturbances, method 200 provides identifying visual disturbances from a video component of the media stream based on the disturbance criteria (step 203). The visual disturbances may be identified using image processing analysis. The image processing analysis may determine participant 122's head positioning, eye positioning, head movement, obscuring of portions of the head (e.g. with participant 122's hand or otherwise), or any other type of visual cue that can be identified from a video image. The video component may be captured by one or more camera components of video client system 102 and may be positioned in multiple locations at participant 122's location. The cameras may include video cameras, video camera arrays, plenoptic cameras, depth sensors, and 3D cameras—including combinations thereof.

Method 200 also provides correlating the audible disturbances with the visual disturbances to determine one or more combined disturbances for participant 122 based on the disturbance criteria (step 204). Each of the combined disturbances comprises at least one of the audible disturbances and at least one of the visual disturbances, which occur substantially contemporaneously so as to be considered components of the same disturbance. For example, while lack of eye contact may be defined as a visual disturbance, lack of eye contact has no audio component that would result in the identification of a combined disturbance. However, something like a sneeze will typically make a sound and involve head movement of some sort (e.g. closing of the eyes or tilting the head). Thus, a disturbance like a sneeze will be identified as a combined disturbance having both an audible and a visual component. In an alternative example, a cough may only be defined as a disturbance if participant 122 does not cover their mouth when coughing. Thus, for a cough to be considered a combined disturbance in that example, both an audible disturbance having the sound of a cough would need to occur contemporaneously with a visual disturbance showing a coughing head motion without a hand covering participant 122's face.

As alluded to in the cough example above, a disturbance may be identified as the absence of some element, with the element in that case being the covering of participant 122's mouth during the cough. The disturbance criteria may therefore include definitions of absences that would constitute an audible, visual, or combined disturbance. In the cough example, the disturbance criteria may indicate that the absence of an "excuse me" or the like from participant 122 following the cough is an audible disturbance. In another example, the absence of blinking and/or eye movement may indicate that participant 122 is staring which the disturbance criteria may define as a visual disturbance.

In some cases, correlating the audible and visual disturbances may identify false positives or false negatives. That is, a visual disturbance may be negated by having no corresponding audible disturbance and vice versa. For example, an audible disturbance may be identified as a sneeze while no corresponding visual disturbance having head/eye movement consistent with a sneeze was identified. Thus, the audible disturbance may be marked as a false positive. Alternatively, a visual disturbance may be consistent with a sneeze while no audible disturbance consistent with a sneeze was identified, as may be the case if participant 122 has an atypical sounding sneeze. In that instance, the audio during the sneeze may be marked as a false negative. These false positives and false negatives may be used to fine tune the disturbance criteria for future disturbance identifications.

Once identified, disturbance system 101 may store (either locally or in a separate storage system) the audio and video components of each of the audible, visual, and combined disturbances, may store information describing each disturbance (e.g. type, duration, etc.), may store the entire media stream while indicating where in the media stream disturbances occurred, or some other type of information relevant to the disturbances—including combinations thereof. In some cases, a combined disturbance may replace its audible and visual disturbance components in favor of the combined disturbance. In other cases, the audible and/or visual disturbance will remain in addition to the combined disturbance of which they are a part. Thus, the disturbances and/or disturbance information may be processed or analyzed after the disturbances have been identified by disturbance system 101.

In particular, disturbance system 101 may process the disturbances to determine a score for the participant based on the disturbances. Factors that affect the disturbance score may be the total amount of disturbances, the frequency of disturbances, the type of disturbance, whether participant 122 is speaking or listening to other participants at the time of the disturbance, or some other factor. The type of disturbance may be whether the disturbance is audible, visual, or combined, or may also be defined more specifically, such as physical reflexes, expressions, non-verbal vocalizations, etc. The score may be on any scale having any granularity (e.g. 1-10, low/medium/high, etc.). In general, larger numbers of disturbances and higher frequencies of disturbances will be scored to indicate a worse performance by participant 122. However, different disturbances or different types of disturbances may be weighted differently depending on the severity of disturbance, which may be defined in the disturbance criteria.

Additionally, disturbance system 101 may remove or repair disturbances in the media stream. For audible disturbances, disturbance system 101 may remove the audio for the disturbance from the media stream. The audio may be replaced with background noise (possibly recorded from prior in the communication) to ensure the silence is not as noticeable to participant 123 when hearing the audio from the media stream. Similarly, a visual disturbance may be replaced by pre-recorded video of participant 122. The video may be recorded from earlier in the communication or may have been recorded at some other time. Ideally, the pre-recorded video segment meshes with participant 122's position in the video frame such that video continuity is substantially maintained for participant 123.

It should be understood that in method 200 the audible disturbances and the visual disturbances need not be identified in the order shown. Steps 202 and 203 may therefore be performed in any order or contemporaneously. Likewise, if done in sequence, one of steps 202 or 203 need not be complete before the other can begin. The identification of combined disturbances at step 204 can occur concurrently with the identification of the audible and visual disturbances or sometime thereafter.

Referring back to FIG. 1, disturbance system 101 comprises a computer processor system and communication interface. Disturbance system 101 may also include other components such as a router, server, data storage system, and power supply. Disturbance system 101 may reside in a single device or may be distributed across multiple devices. While shown separately, disturbance system 101 may be incorporated into one or more of video client systems 102 and 103. Disturbance system 101 may be a video communication server, conferencing system, application server, personal computer workstation, network gateway system, or some other computing system—including combinations thereof.

Video client systems 102 and 103 each comprise a computer processor system, at least one video camera, at least one microphone, and communication interface. Video client systems 102 and 103 may also include other components such as a router, server, data storage system, and power supply. Video client systems 102 and 103 may each reside in a single device or may be distributed across multiple devices. Alternatively, client 103 may be a more traditional videoconferencing client without the view control functionality. Video client systems 102 and 103 may be a telephone, computer, tablet, e-book, mobile Internet appliance, network interface card, media player, game console, application server, proxy server, or some other communication apparatus—including combinations thereof.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

Figure 3:
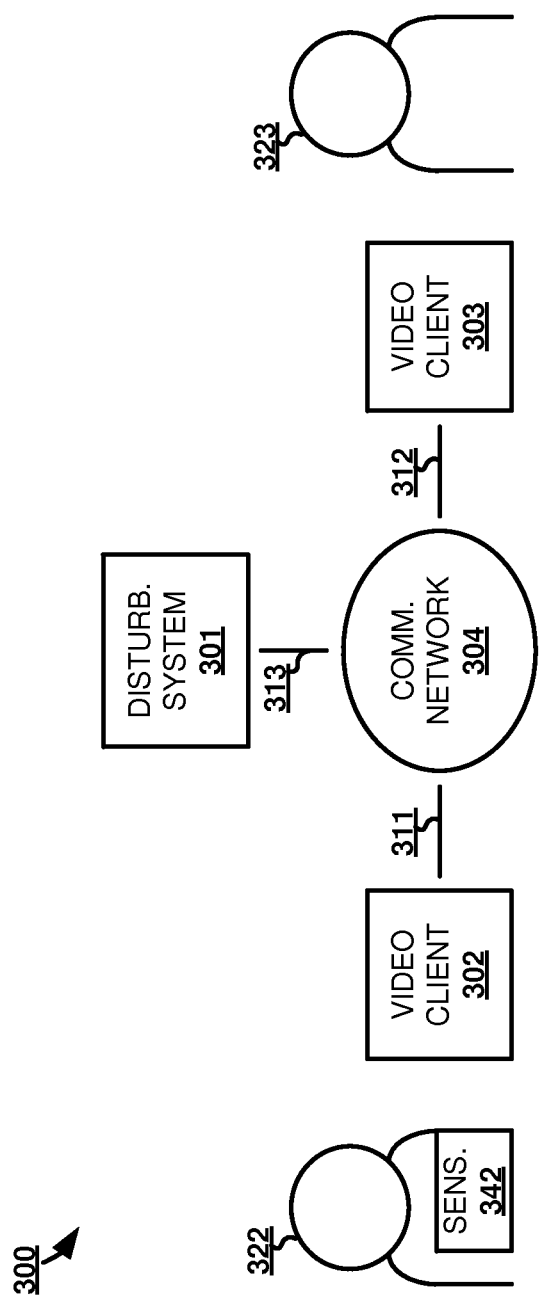
FIG. 3 illustrates a video communication environment for detecting disturbances in video communications.

FIG. 3 illustrates video communication environment 300 in an example of detecting disturbances in video communications. Video communication environment 300 includes disturbance system 301, video client system 302, video client system 303, communication network 304, and one or more biometric sensors 342. Video client systems 302 and 303 are operated by agent 322 and caller 323, respectively. Video client system 302 and communication network 304 communicate over communication link 311. Video client system 303 and communication network 304 communicate over communication link 312. Disturbance system 301 and communication network 304 communicate over communication link 313.

Communication network 304 comprises network elements that provide communications services. Communication network 304 may comprise switches, wireless access nodes, Internet routers, network gateways, application servers, computer systems, communication links, or some other type of communication equipment—including combinations thereof. Communication network 304 may be a single network (e.g. local area network, wide area network, the Internet, etc.) or may be a collection of networks.

Disturbance system 301 is a system connected to communication network 304 along with video client systems 302 and 303. Media streams for communications between video client systems 302 and 303 may pass through disturbance system 301 or disturbance system 301 may receive copies of any media streams upon which it operates. While not shown disturbance system 301 may be incorporated into a system that facilitates the video communications between video client systems 302 and 303. Alternatively, disturbance system 301 may be incorporated into one or more of video client systems 302 and 303.

In this example, agent 322 is employed by a contact center and is tasked with representing an entity associated with the contact center. Agent 322 may be charged with selling products or services provided by the entity, providing technical support for products sold by the company, or serve any other purpose that can be performed with callers over a video communication. Likewise, caller 323 is a customer or potential customer that may be dialing into the contact center for assistance from one of the contact center's agents on a video communication. The video communication may be routed to agent 322 based on agent 322's expertise, role within the contact center, availability, or for some other reason. It is in the contact center's and the entity's best interest for the video communication to proceed with minimal disturbances. Therefore, as discussed in more detail below, the contact center uses disturbance system 301 to identify disturbances to assist agents to minimize disturbances (either on a current communication, at a later time through training, or through the contact center as a whole through staffing decisions based on disturbances), to remedy disturbances as they happen, or some combination thereof.

Figure 4:
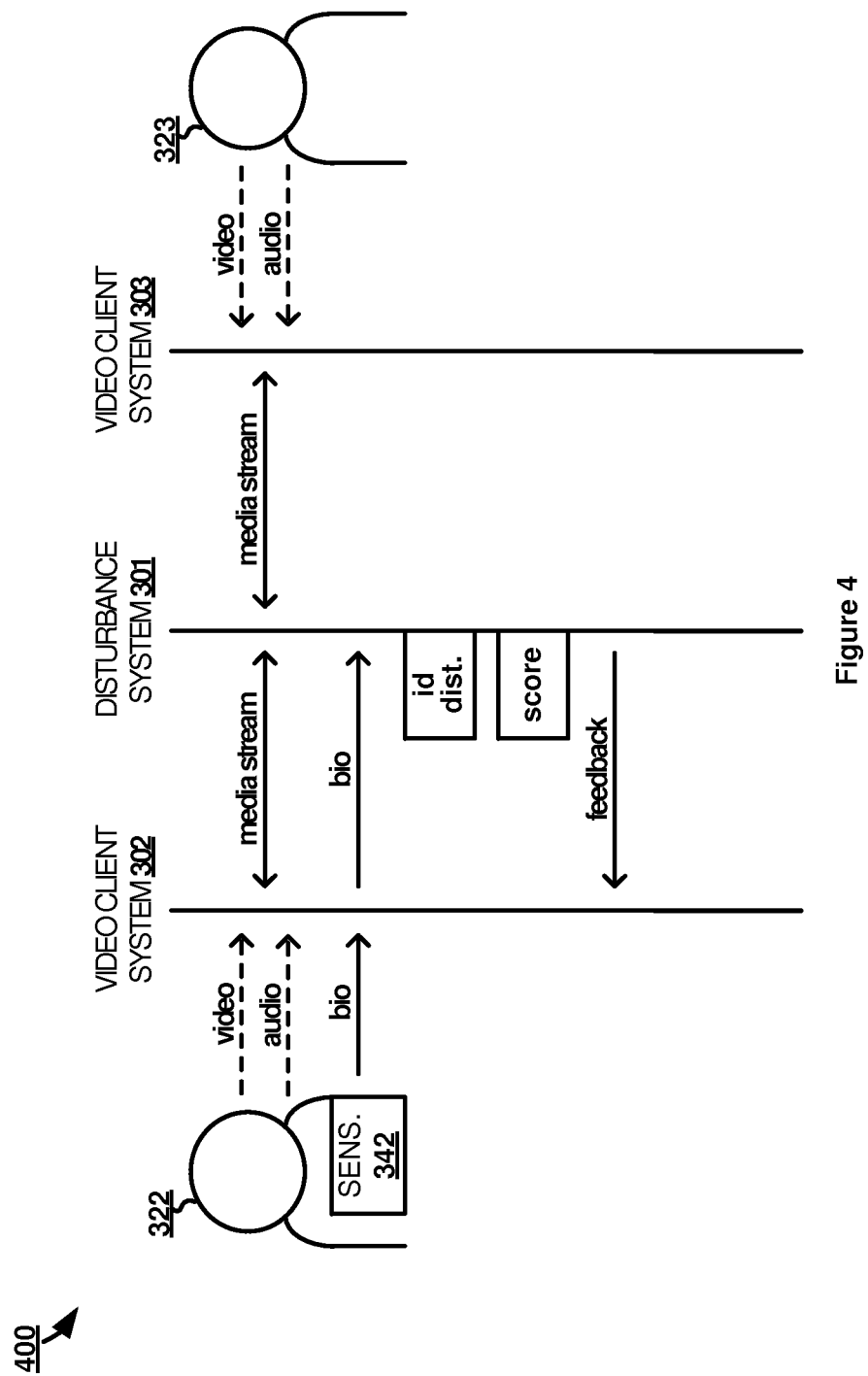
FIG. 4 illustrates an operational scenario of the video communication environment to detect disturbances in video communications.

FIG. 4 illustrates an operational scenario 400 of video communication environment 300 to detect disturbances in video communications. In this example, a video communication has been established between agent 322 and caller 323. Accordingly, audio and video is captured of agent 322 and caller 323 by their respective video client systems 302 and 303. The audio and video captured by each video client system is converted into a media stream for transfer to the other video client system for display. This process continues in substantially real-time to allow for real-time video communications between agent 322 and caller 323.

From the video and audio of the media stream, disturbance system 301 uses method 200 from above to identify audible, visual, and combined disturbances. However, in this embodiment, disturbance system 301 also receives biometric information about agent 322. The biometric information is captured by biometric sensors 342 positioned on or around agent 322. The biometric sensors may be built into another component of video client system 302 or may be independent components of video client system 302 that communicate using wired or wireless signaling (e.g. Bluetooth or WiFi). Biometric sensors 342 may include a heart rate monitor, a blood pressure monitor, an accelerometer, or any other type of sensor that can gather information about agent 322 to assist in identifying disturbances. The biometric information may be correlated along with audible, visual, and combined disturbances to increase the efficacy of disturbance system 301 to identify disturbances. Likewise, the biometric information may allow for disturbances to be identified more quickly than they otherwise would.

The disturbance criteria that disturbance system 301 uses to identify disturbances may further define biometric information that would indicate a disturbance. For example, the disturbance criteria may include a head motion pattern that is typical of a sneeze. Thus, in addition to an audible and/or visual disturbance that indicates a sneeze, biometric information from an accelerometer on agent 322's head may further indicate that agent 322's head moved in a manner consistent with a sneeze. Moreover, the biometric information may be able to be interpreted faster than image processing can identify the head movement from the video of agent 322.

Additionally, though not shown in this embodiment, video communication environment 300 may include environmental sensors that capture information about agent 322's location, such as temperature, lighting, humidity, and the like.

The disturbance criteria may therefore also factor in certain environmental conditions when defining disturbances.

Once audible, visual, and combined disturbances, if any, are identified, disturbance system 301 determines a disturbance score for agent 322. The score may be generated for the individual communication between agent 322 and caller 323, for a portion of that communication, for multiple communications with agent 322 (e.g. within a period of time, such as hour, day, week, etc.), for a group of agents at the contact center, for the contact center as a whole, or for some other delineation—including combinations thereof. Disturbance system 301 may adjust the score as the communication progresses or may wait until some time after the communication ends so that all the disturbances identified on the communication can be factored into the score together. The score may then be used to determine which agents have issues with disturbances so that proper actions (e.g. training, re-staffing, etc.) can be taken to improve the score.

Additionally, in this embodiment, disturbance system 301 provides feedback during or after the communication to video client system 302. Video client system 302 can then indicate the feedback visually, audibly, or in some other way, to agent 322. Upon getting the feedback, agent 322 can adjust their actions on the communication or in future communications to reduce the number of disturbances and, if a score is generated, improve their disturbance score. For example, if disturbance system 301 has identified that the agent is touching their face too much (e.g. above a threshold frequency or number of times in the communication), agent 322 may receive feedback indicating that agent 322 should stop touching their face.

In some embodiments, the media stream may not include a video component, as may be the case in traditional call center communications, when video is not supported by a caller, when video is not desired by a caller, or for some other reason. In these cases, the biometric information may be used in a manner similar to that described above by disturbance system 301 to identify audible disturbances without also identifying visual and combined disturbances. For example, an accelerometer reading indicating a head nod consistent with a sneeze may be correlated with audio of the sneeze to confirm that a sneeze has occurred. Alternatively, a visual component may still be captured used by disturbance system 301 in the manner disclosed above to assist in identifying audible disturbances even though the video component of the media stream is not transferred to video client system 303. For example, head movement in the video component that is consistent with a sneeze may be used to confirm that an audible disturbance is a sneeze.

Figure 5:
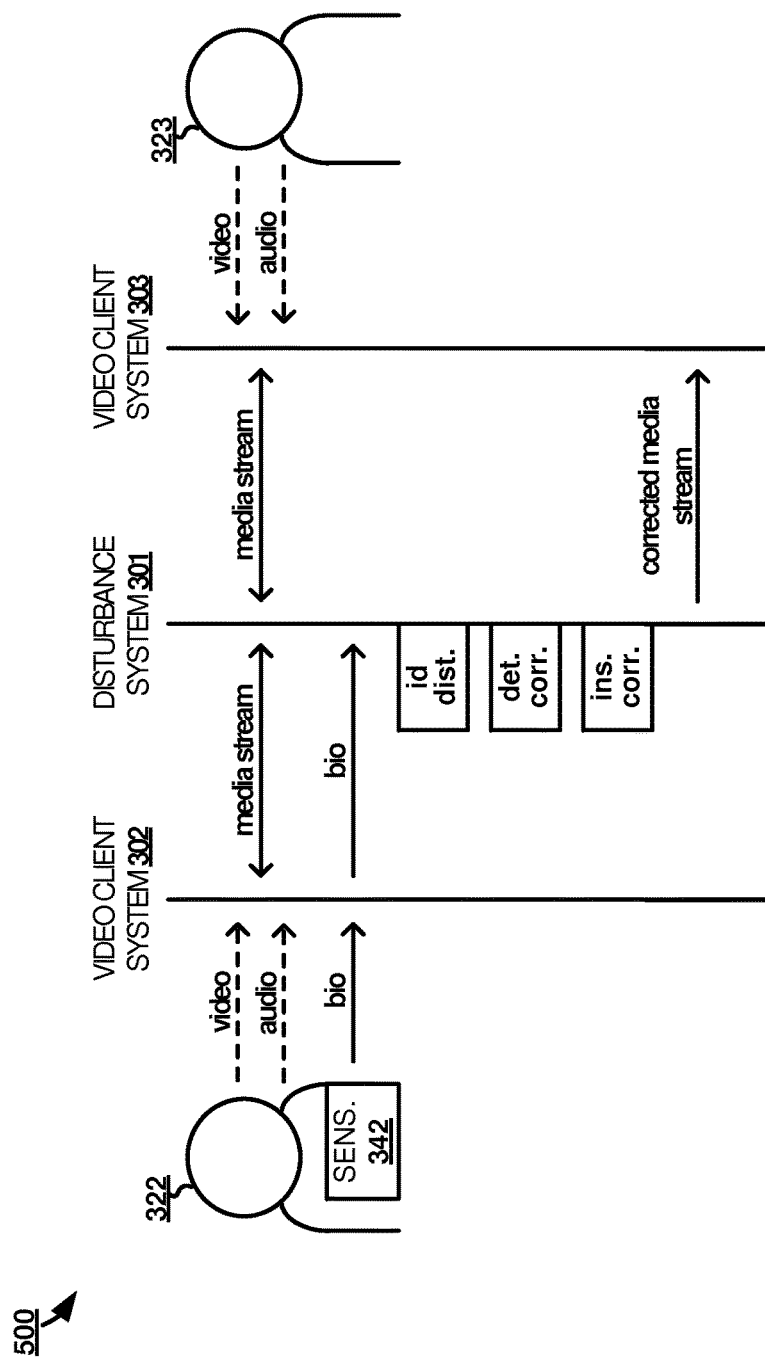
FIG. 5 illustrates an operational scenario of the video communication environment to detect and correct disturbances in video communications.

FIG. 5 illustrates another operational scenario 500 of video communication environment 300 to detect and correct disturbances in video communications. In this example, a video communication has been established in much the same way as the communication in operational scenario 400. However, in this example, disturbance system 301 is capable of correcting at least some of the audible, visual, or combined disturbances. In order for correction to work, the disturbances must be identified in real-time so that the disturbance identification and the correction do not delay and disturb the communication any more than the disturbance itself.

When a disturbance is identified by disturbance system 301, disturbance system 301 determines whether the disturbance is one that can be corrected and, if so, what correction is needed. In some cases, audible disturbances (or the audible component of a combined disturbance) may be corrected by removing them from the audio component of the media stream. Alternatively, if an audible disturbance cannot be removed in time to not further disturb the communication, then a pre-recorded message from agent may be added after the disturbance. For example, if agent 322 coughs and does not make a statement akin to "excuse me" after the cough, disturbance system 301 may insert prerecorded audio of such a statement after the cough as a correction. Any correction applied to the audio should not overlap any of agent 322's non-disturbance speech. Additionally, a visual disturbance (or the visual component of a combined disturbance) may be corrected by replacing with video frames showing agent 322 without the disturbance. Those replacement frames may be prerecorded or synthesized by disturbance system 301 or some other system. Some visual processing may be needed to ensure the transition from the communication video frames to the replacement frames is not a disturbance in itself.

In real-time the corrections are made to the media stream before the media stream is transferred to video client system 303. Thus, caller 323 does not have to experience the disturbance when the media stream is presented by video client system 303. For example, if agent 322 sneezes, then caller 323 will not see or hear the sneeze due to the corrections applied by disturbance system 301.

Figure 6:
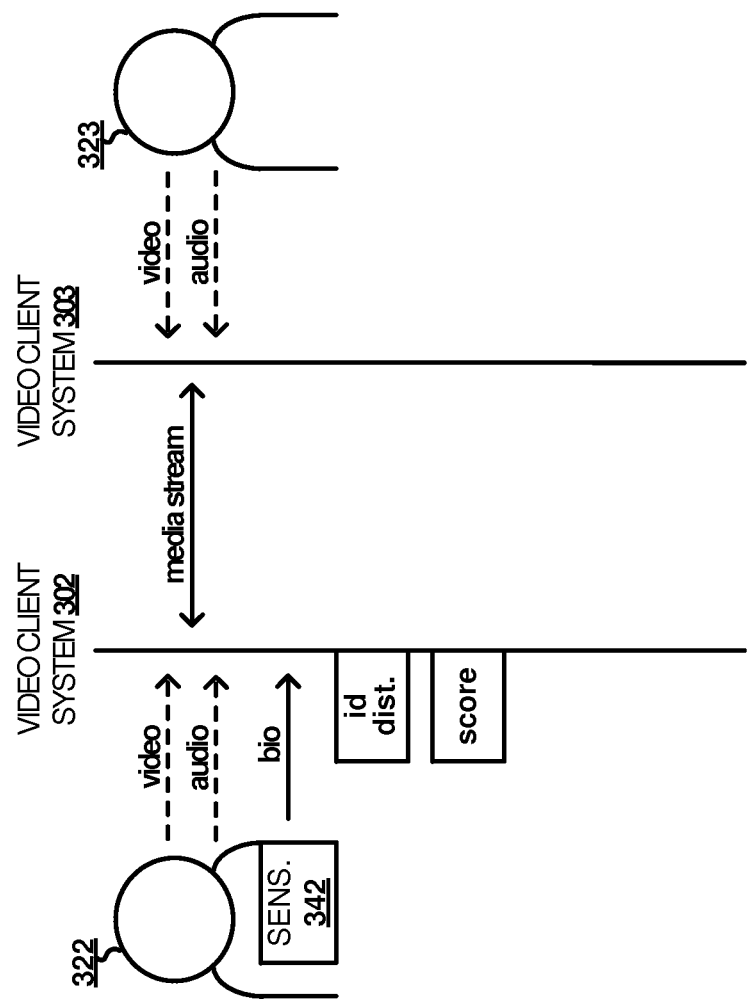
FIG. 6 illustrates an operational scenario of the video communication environment to detect disturbances in video communications.

FIG. 6 shows another operational scenario 600 of video communication environment 300 to detect disturbances in video communications. In this example, the functions of disturbance system 301 are incorporated into video client system 302. Thus, client system 302 captures audio and video of agent 322 through its camera and microphone interface. Then instead of transferring the media stream to disturbance system 301, client system 302 identifies audible, visual, and combined disturbances itself. In this example, video client system 302 further generates a disturbance score. However, in other examples, video client system 302 may transfer information about the identified disturbances to another system, such as disturbance system 301, to generate the score. Also, like in operational scenario 400, video client system 302 may provide feedback to agent 322 about the identified disturbances.

Figure 7:
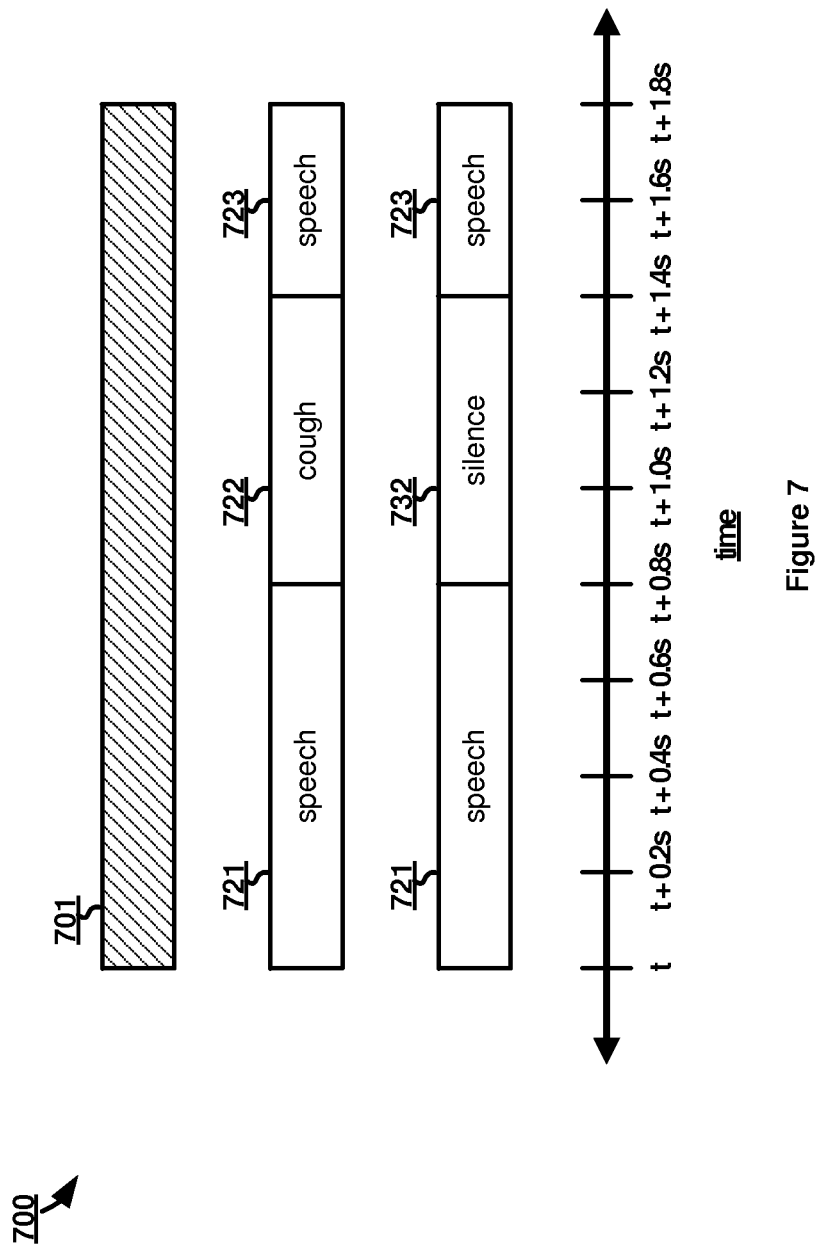
FIG. 7 illustrates an exemplary media stream segment when detecting disturbances in video communications.

FIG. 7 illustrates an exemplary media stream segment 700 when detecting disturbances in video communications. Audio segment 701 represents a 1.8 second portion of the audio component of a media stream. Within that audio segment is a speech segment 721, a cough segment 722, and another speech segment 723. In the embodiments above, the 0.6 seconds that contain cough segment 722 would be identified as an audible disturbance. Cough segment 722 may then be factored into a disturbance score or information regarding cough segment 722 may be stored for future reference. Moreover, in some examples, cough segment 722 is corrected with silence segment 732. Silence segment 732 may be complete silence, may be a removal of the speaking voice while leaving background noise so that the silence is not as noticeable, or may comprise some other means of removing cough 722 from the audio. Additionally, though not shown, a video segment corresponding to audio segment 701 may also be corrected to remove video frames showing the coughing action.

Figure 8:
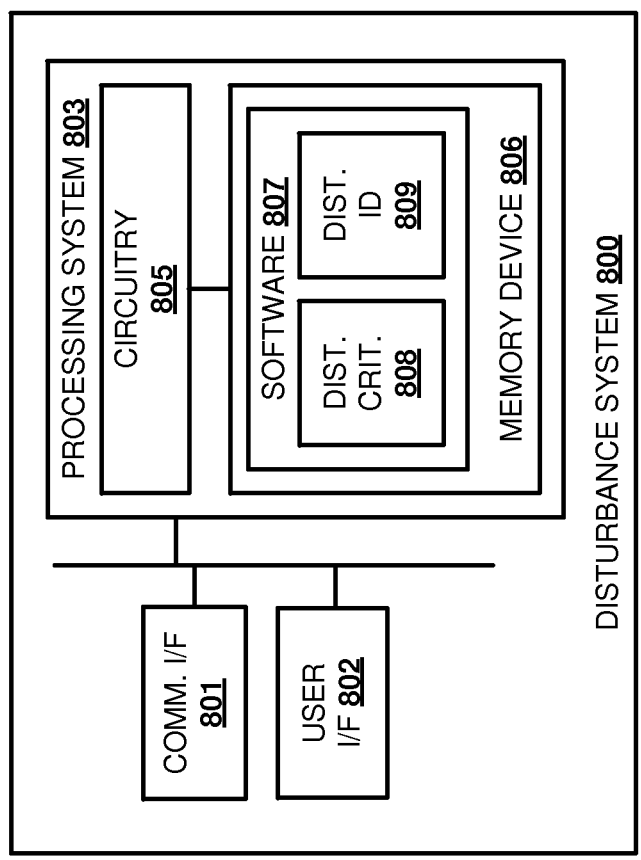
FIG. 8 illustrates a disturbance system for detecting disturbances in video communications.

FIG. 8 illustrates disturbance system 800. Disturbance system 800 is an example of disturbance system 101, although system 101 could use alternative configurations. Disturbance system 800 comprises communication interface 801, user interface 802, and processing system 803. Processing system 803 is linked to communication interface 801 and user interface 802. Processing system 803 includes processing circuitry 805 and memory device 806 that stores operating software 807. Disturbance system 800 may include other well-known components such as a battery and enclosure that are not shown for clarity. Disturbance system 800 may be a personal computer, tablet, application server, conferencing system, private branch exchange, or some other computing apparatus—including combinations thereof. In some examples, disturbance system 800 may be replicated across multiple locations in order to distribute the processing load required to function as described herein.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes disturbance criteria module 808 and disturbance identification module 809. Operating software 807 may further include an operating system, utilities, drivers, network interfaces, applications, or some other type of software. When executed by processing circuitry 805, operating software 807 directs processing system 803 to operate disturbance system 800 as described herein.

In particular, disturbance criteria module 808 directs processing system 803 to identify disturbance criteria defining a plurality of audible disturbances, a plurality of visual disturbances, and a plurality of communication disturbances. Disturbance identification module 809 directs processing system 803 to identify one or more audible disturbances from an audio component of the media stream based on predefined disturbance criteria and identify one or more visual disturbances from a video component of the media stream based on the disturbance criteria. Disturbance identification module 809 further directs processing system 803 to correlate the audible disturbances with the visual disturbances to determine one or more combined disturbances for the participant based on the disturbance criteria, wherein each of the combined disturbances comprises at least one of the audible disturbances and at least one of the visual disturbances.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of detecting disturbances in a first media stream captured of a participant on a communication, the method comprising:
   identifying one or more audible disturbances from an audio component of the first media stream based on disturbance criteria defining a plurality of audible disturbances, a plurality of visual disturbances, and a plurality of combined disturbances;
   identifying one or more visual disturbances from a video component of the first media stream based on the disturbance criteria;
   correlating the audible disturbances with the visual disturbances to determine one or more combined disturbances for the participant based on the disturbance criteria, wherein each of the combined disturbances comprises at least one of the audible disturbances and at least one of the visual disturbances;
   for at least one combined disturbance of the combined disturbances, removing the at least one audible disturbance of the at least one combined disturbance from the first media stream before transferring the first media stream to another participant on the communication.

2. The method of claim 1, further comprising:
   receiving biometric information about the participant contemporaneously with the first media stream; and
   correlating the biometric information along with the audible disturbances and the visual disturbances to determine the combined disturbances.

3. The method of claim 1, further comprising:
   correlating the audible disturbances with the visual disturbances to determine whether at least one of the audible disturbances and at least one of the visual disturbances were falsely identified.

4. The method of claim 1, further comprising:
   determining a disturbance score for the participant based on the audible, visual, and combined disturbances.

5. The method of claim 4, wherein factors used when determining the disturbance score comprise one or more of a total amount of disturbances, an amount of disturbances by type of disturbance, and frequency of disturbances.

6. The method of claim 1, further comprising:
   for at least one disturbance of the audible, visual, and combined disturbances, replacing the at least one disturbance in the first media stream with a prerecorded media stream element.

7. The method of claim 1, further comprising:
   for at least one disturbance of the audible, visual, and combined disturbances, inserting a prerecorded media stream element into the first media stream after the at least one disturbance.

8. The method of claim 1, further comprising:
   providing the participant with feedback concerning the audible, visual, and combined disturbances.

9. The method of claim 8, wherein the feedback includes at least one recommendation for mitigating at least one of the audible, visual, and combined disturbances.

10. A system for detecting disturbances in a first media stream captured of a participant on a communication, the system comprising:
 an interface configured to receive an audio component of the first media stream and a video component of the first media stream; and
 a processing system configured to:
  identify one or more audible disturbances from the audio component of the first media stream based on disturbance criteria defining a plurality of audible disturbances, a plurality of visual disturbances, and a plurality of combined disturbance;
  identify one or more visual disturbances from the video component of the first media stream based on the disturbance criteria;
  correlate the audible disturbances with the visual disturbances to determine one or more combined disturbances for the participant based on the disturbance criteria, wherein each of the combined disturbances comprises at least one of the audible disturbances and at least one of the visual disturbances; and
  for at least one combined disturbance of the combined disturbances, remove the at least one audible disturbance of the at least one combined disturbance from the first media stream before transferring the first media stream to another participant on the communication.

11. The system of claim 10, further comprising:
 the interface configured to receive biometric information about the participant contemporaneously with the first media stream; and
 the processing system configured to correlate the biometric information along with the audible disturbances and the visual disturbances to determine the combined disturbances.

12. The system of claim 10, further comprising:
 the processing system configured to correlate the audible disturbances with the visual disturbances to determine whether at least one of the audible disturbances and at least one of the visual disturbances were falsely identified.

13. The system of claim 10, further comprising:
 the processing system configured to determine a disturbance score for the participant based on the audible, visual, and combined disturbances.

14. The system of claim 13, wherein the processing system is configured to use one or more of a total amount of disturbances, an amount of disturbances by type of disturbance, and frequency of disturbances as factors when determining the disturbance score.

15. The system of claim 10, further comprising:
 the processing system configured to, for at least one disturbance of the audible, visual, and combined disturbances, replace the at least one disturbance in the first media stream with a prerecorded media stream element.

16. The system of claim 10, further comprising:
 the processing system configured to, for at least one disturbance of the audible, visual, and combined disturbances, insert a prerecorded media stream element into the first media stream after the at least one disturbance.

17. The system of claim 10, further comprising:
 the processing system configured to provide the participant with feedback concerning the audible, visual, and combined disturbances.

18. The system of claim 17, wherein the feedback includes at least one recommendation for mitigating at least one of the audible, visual, and combined disturbances.

* * * * *